United States Patent
Choi (10) Patent No.: US 11,169,244 B2
(45) Date of Patent: Nov. 9, 2021

(54) METHOD OF CALIBRATING ALIGNMENT MODEL FOR SENSORS AND ELECTRONIC DEVICE PERFORMING THE METHOD

(71) Applicant: Samsung Electronics Co., Ltd., Suwon-si (KR)

(72) Inventor: SungDo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 16/247,743

(22) Filed: Jan. 15, 2019

(65) Prior Publication Data
US 2020/0081092 A1    Mar. 12, 2020

(30) Foreign Application Priority Data
Sep. 7, 2018 (KR) .......................... 10-2018-0106994

(51) Int. Cl.
| G01S 7/40 | (2006.01) |
| G01S 13/931 | (2020.01) |
| G01S 13/32 | (2006.01) |
| G01S 13/89 | (2006.01) |

(52) U.S. Cl.
CPC ............ *G01S 7/4004* (2013.01); *G01S 13/32* (2013.01); *G01S 13/89* (2013.01); *G01S 13/931* (2013.01)

(58) Field of Classification Search
CPC ........ G01S 7/40; G01S 7/40045; G01S 13/32; G01S 13/86; G01S 13/867; G01S 13/931
See application file for complete search history.

(56) References Cited

U.S. PATENT DOCUMENTS

| 5,440,312 | A | | 8/1995 | Anderson | |
| 5,755,400 | A | | 5/1998 | Kalms, III | |
| 5,894,323 | A | * | 4/1999 | Kain | G01C 11/02 |
| | | | | | 348/116 |
| 2003/0210181 | A1 | * | 11/2003 | Hager | G01S 7/292 |
| | | | | | 342/165 |
| 2009/0228204 | A1 | * | 9/2009 | Zavoli | G01S 19/49 |
| | | | | | 701/532 |
| 2013/0169811 | A1 | * | 7/2013 | Smitherman | G01S 19/14 |
| | | | | | 348/148 |

(Continued)

FOREIGN PATENT DOCUMENTS

| JP | 2010-72973 A | 4/2010 |
| JP | 2017-106806 A | 6/2017 |

(Continued)

*Primary Examiner* — Peter M Bythrow
(74) *Attorney, Agent, or Firm* — NSIP Law (57) ABSTRACT

A method of calibrating an alignment model between a first sensor that uses a radar and a second sensor that determines a position of a sensor, and an electronic device performing the method. A radar map for surroundings of the first sensor and the second sensor is generated based on the first sensor and the second sensor, and at least one object located around the first sensor and the second sensor is detected based on pre-generated data. Also, target data corresponding to the object is determined based on the radar map, an error of the target data is calculated based on a shape of the object and the target data, and the alignment model between the first sensor and the second sensor is calibrated based on the error.

16 Claims, 10 Drawing Sheets

(56) References Cited

U.S. PATENT DOCUMENTS

| | | | | |
|---|---|---|---|---|
| 2014/0172357 A1* | 6/2014 | Heinonen | ............ | G01C 21/005 702/150 |
| 2014/0376821 A1* | 12/2014 | Meir | ...................... | G01S 13/89 382/218 |
| 2017/0307763 A1* | 10/2017 | Browning | ............... | G01S 19/48 |
| 2018/0196127 A1* | 7/2018 | Harada | .................. | G08G 1/161 |
| 2018/0232947 A1* | 8/2018 | Nehmadi | .............. | G01S 17/931 |
| 2018/0259621 A1* | 9/2018 | Yamazaki | ............. | G01S 13/867 |
| 2018/0267142 A1* | 9/2018 | Motoyama | ................ | G06T 7/74 |
| 2019/0120955 A1* | 4/2019 | Zhong | ................... | G01S 13/584 |
| 2019/0162820 A1* | 5/2019 | Agarwal | ............... | G01S 13/931 |
| 2019/0265330 A1* | 8/2019 | Rajendran | ............. | G01S 7/4026 |
| 2019/0353784 A1* | 11/2019 | Toledano | ................ | G01S 17/86 |

FOREIGN PATENT DOCUMENTS

| | | |
|---|---|---|
| KR | 10-2014-0135410 A | 11/2014 |
| KR | 10-2017-0070977 A | 6/2017 |
| KR | 10-1750615 B1 | 6/2017 |
| WO | WO 2017/181642 A1 | 10/2017 |

\* cited by examiner

METHOD OF CALIBRATING ALIGNMENT MODEL FOR SENSORS AND ELECTRONIC DEVICE PERFORMING THE METHOD

CROSS-REFERENCE TO RELATED APPLICATION

This application claims the benefit under 35 USC § 119(a) of Korean Patent Application No. 10-2018-0106994, filed on Sep. 7, 2018, in the Korean Intellectual Property Office, the entire disclosure of which is incorporated herein by reference for all purposes.

BACKGROUND

1. Field

The following description relates to a technology of calibrating an alignment model for sensors, and more particularly, to a technology of calibrating an alignment model based on a posture error and a transition error between sensors.

2. Description of Related Art

An autonomous vehicle, or a driver assistance system installed in a vehicle detects an object located around the autonomous vehicle or the driver assistance system by propagating a signal around the autonomous vehicle or the driver assistance system, receiving a reflected signal, and analyzing the received signal. For example, a distance between a vehicle and an object may be calculated based on an amount of time it took for a propagated signal to be reflected and returned, and a direction of the object may be determined based on an angle at which the reflected signal is received and a strength of the reflected signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an alignment model calibration method includes generating a radar map for surroundings of a first sensor and a second sensor, the first sensor being configured to use a radar and the second sensor being configured to determine a position of the second sensor, detecting at least one object located around the first sensor and the second sensor based on pre-generated data, determining target data corresponding to the at least one object based on the radar map, calculating an error of the target data based on a shape of the at least one object and the target data, and calibrating an alignment model between the first sensor and the second sensor based on the error.

The generating of the radar map may include generating the radar map based on the alignment model between the first sensor and the second sensor. The alignment model may be used to process data acquired by the first sensor and the second sensor based on a position relationship between the first sensor and the second sensor, and a difference between an attitude of the first sensor and an attitude of the second sensor.

The generating of the radar map may include determining a position of radar data acquired by the first sensor on the radar map based on position information acquired by the second sensor, and generating the radar map by accumulating radar data.

The detecting of the at least one object may include generating a surrounding image by capturing the surroundings of the first sensor and the second sensor using a camera, and detecting the at least one object based on the surrounding image.

The detecting of the at least one object may include acquiring map data for the surroundings of the first sensor and the second sensor based on the second sensor, and detecting the at least one object based on the map data.

The calculating of the error of the target data may include identifying the at least one object, acquiring a structural shape of the identified at least one object, and calculating the error by fitting the structural shape and the target data.

The calibrating of the alignment model may include determining a pattern of the error based on the error, and calibrating the alignment model based on the pattern of the error.

The pattern of the error may include at least one of a transition error pattern indicting an error in a position relationship between the first sensor and the second sensor, and an attitude error pattern indicating an attitude error between an attitude of the first sensor and an attitude of the second sensor.

The calibrating of the alignment model may include calibrating the alignment model to minimize the error.

The first sensor may be configured to use a frequency-modulated continuous-wave (FMCW) signal or a phase-modulated continuous-wave (PMCW) signal.

The second sensor may include any one or any combination of a global navigation satellite system (GNSS), a global positioning system (GPS) and an inertial measurement unit (IMU).

The first sensor and the second sensor may be included in a vehicle.

The vehicle may be an autonomous vehicle, or may have a function of an advanced driver assistance system (ADAS).

In another general aspect, an electronic device includes a memory configured to store a program, and a processor configured to execute the program, wherein the program is executed to perform generating a radar map for surroundings of a first sensor and a second sensor, the first sensor being configured to use a radar and the second sensor being configured to determine a position of the second sensor, detecting at least one object located around the first sensor and the second sensor based on pre-generated data, determining target data corresponding to the at least one object based on the radar map, calculating an error of the target data based on a shape of the at least one object and the target data, and calibrating an alignment model between the first sensor and the second sensor based on the error.

The electronic device may further include the first sensor and the second sensor.

The electronic device may be included in an autonomous vehicle, or a vehicle having a function of an ADAS.

In another general aspect, a method includes generating a radar map based on data obtained by first sensor configured to use a radar and a second sensor configured to determine a position, detecting an object located around the first sensor and the second sensor, acquiring a structural shape of the object, calibrating an alignment model between the first sensor and the second sensor, acquiring target data corresponding to the object based on the radar map and the calibrated alignment model, and fitting the structural shape of the object to the target data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

Figure 1:
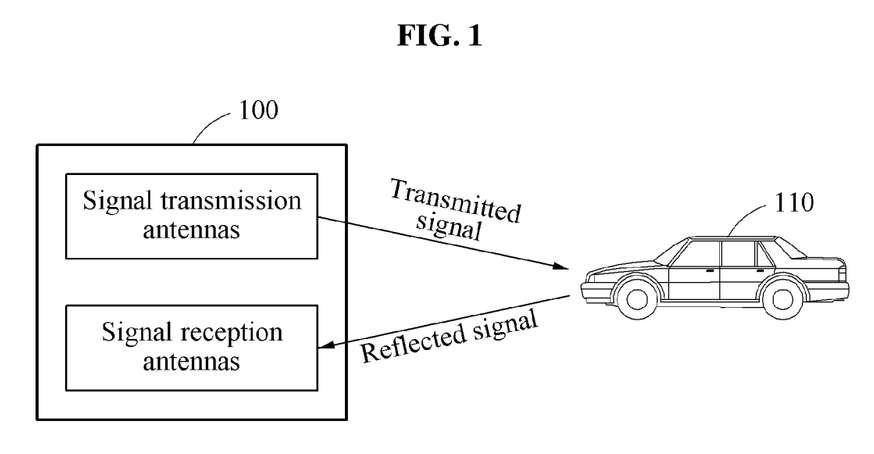
FIG. 1 illustrates an example of a method of detecting an object using a radar.

FIG. 1 illustrates an example of a method of detecting an object using a radar.

Referring to FIG. 1, a method of propagating a signal around a vehicle and detecting a signal reflected by an object 110 located in the vicinity of the vehicle is used as a method of detecting the object 110. For example, a radar 100 of the vehicle propagates a signal for detecting an object around the vehicle and calculates a time of flight (ToF) from a signal reflected by the object 110, to calculate a distance between the vehicle and the object 110.

To distinguish the signal reflected by the object 110 from other signals such as noise, the radar 100 propagates a modulated signal around the vehicle. In an example, the modulated signal is a frequency-modulated continuous-wave (FMCW) signal. The FMCW signal is, for example, a signal having a frequency modulated based on 79 gigahertz (GHz). A bandwidth (BW) of the FMCW signal is in a range of 77 GHz to 81 GHz, but is not limited thereto. When a millimeter wave in a band of 79 GHz is used, a relatively high resolution is provided.

In another example, the modulated signal is a signal modulated using a frequency shift keying (FSK). In still another example, the modulated signal is a phase-modulated continuous-wave (PMCW) signal.

For example, the radar 100 includes signal transmission antennas configured to transmit signals. The signal transmission antennas may be arranged at different directional angles, or arranged or embodied so that the directional angles are adjustable. The radar 100 also includes signal reception antennas configured to receive signals. The signal reception antennas may be arranged at different directional angles, or arranged or embodied so that the directional angles are adjustable.

In an example, when the object 110 is detected through the reflected signal, the vehicle may inform a driver of information of the object 110. In another example, the vehicle may support the driver using an advanced driver assistance system (ADAS). In still another example, when the vehicle is an autonomous vehicle, the vehicle may set a traveling path of the vehicle based on the object 110.

Objects around the vehicle are detected based on data acquired by the radar 100 and speeds and positions of the detected objects are calculated. However, it is difficult to acquire information about a shape of an object due to an object reflection characteristic of the radar 100. To acquire a shape of an object, a method of imaging surroundings of the radar 100 based on a change in a position of the radar 100 and data acquired while the radar 100 moves, may be used.

Imaging of surroundings of the radar 100 includes generating a radar map based on data acquired by the radar 100. A scheme of generating a radar map includes, for example, a grip map scheme and a point cloud scheme. The above schemes employ a scheme of accurately detecting a position of a device or a platform (for example, a vehicle) in which the radar 100 is installed, and of spatially and temporally accumulating information of an object acquired from the radar 100 based on information about the detected position.

A position sensor (or a device) to measure the position of the radar 100 and position information may not be physically located at the same place, and accordingly the position of the radar 100 and a position of the position sensor may differ from each other. To accurately generate a radar map, a relationship between the position of the radar 100 and the position of the position sensor needs to be calibrated. The relationship between the positions is referred to as an "alignment model." When an alignment model between the radar 100 and the position sensor is inaccurate, it becomes rather difficult to acquire information about a shape of an object. An example of calibrating the alignment model between the radar 100 and the position sensor will be further described below with reference to FIGS. 2 through 13.

Figure 2:
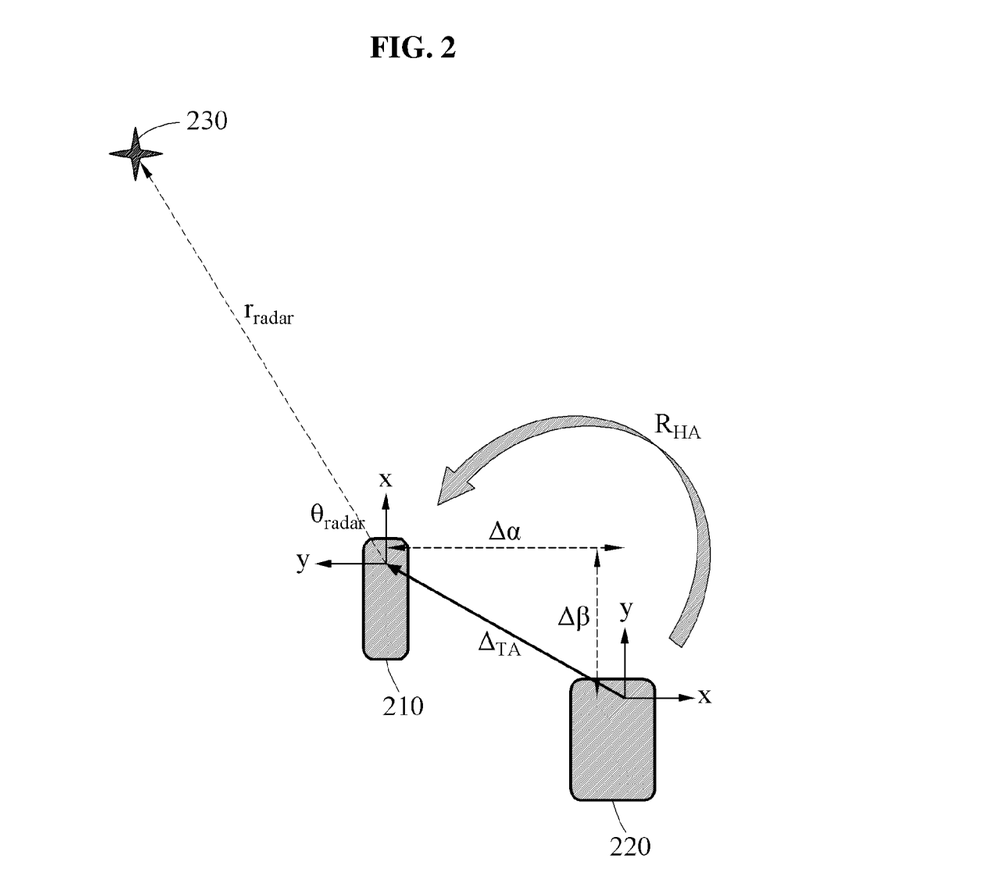
FIG. 2 illustrates an example of an alignment model between a radar sensor and a position sensor.

FIG. 2 illustrates an example of an alignment model between a radar sensor and a position sensor.

An alignment model includes a position relationship between a radar sensor 210 and a position sensor 220 and an attitude relationship between the radar sensor 210 and the position sensor 220.

The position relationship is expressed as a distance between a reference point of the radar sensor 210 and a reference point of the position sensor 220. The position relationship is set based on three-dimensional (3D) distance coordinate axes. Although FIG. 2 illustrates $\Delta\alpha$ and $\Delta\beta$, based on two-dimensional (2D) distance coordinate axes (plane), $\Delta\gamma$ denoting a height difference between the radar sensor 210 and the position sensor 220 for 3D distance coordinate axes is added to the position relationship.

The attitude relationship is a difference between an attitude of the radar sensor 210 and an attitude of the position sensor 220. An attitude is expressed using 3D axes. For example, the 3D axes may be axes that define a pitch, a roll and a yaw.

In FIG. 2, an attitude is shown by 2D axes (plane). When the attitude is represented by 2D axes, a difference between attitudes is a difference between a heading angle of the radar sensor 210 and a heading angle of the position sensor 220. Although an x-axis of the radar sensor 210 is a central axis of the heading angle and a y-axis of the position sensor 220 is a central axis of the heading angle as shown in FIG. 2, the central axes may vary depending on examples.

A position of an object 230 is calculated using Equations 1 through 3 as shown below.

$$x_{radar} = r_{radar} \times \sin \theta_{radar}$$

$$y_{radar} = r_{radar} \times \cos \theta_{radar} \quad \text{[Equation 1]}$$

Equation 1 is used to calculate a position ($x_{radar}$, $y_{radar}$) of the object 230 from the radar sensor 210. In Equation 1, $r_{radar}$ denotes a distance between the object 230 and the radar sensor 210 which is measured by the radar sensor 210, and $\theta_{radar}$ denotes an angle between the heading angle of the radar sensor 210 and the object 230.

$$x^{ldc}_{radar} = x_{radar} + \Delta\beta$$

$$y^{ldc}_{radar} = x_{radar} + \Delta\alpha \quad \text{[Equation 2]}$$

Equation 2 is used to calculate a position ($x^{ldc}_{radar}$, $y^{ldc}_{radar}$) of the object 230 from the position sensor 220.

$$[x_g y_g]^T = R_{HA} * [x^{ldc}_{radar} y^{ldc}_{radar}]^T + [x_{gnss} y_{gnss}]^T \quad \text{[Equation 3]}$$

Equation 3 is used to calculate a global position ($x_g$, $y_g$) of the object 230. In Equation 3, $R_{HA}$ denotes a difference between the attitude of the radar sensor 210 and the attitude of the position sensor 220. When an attitude is expressed by 2D axes, $R_{HA}$ may denote a difference between the heading angle of the radar sensor 210 and the heading angle of the position sensor 220. Also, $x_{gnss}$ and $y_{gnss}$ denote a 2D global position of the position sensor 220. For example, $x_{gnss}$ and $y_{gnss}$ may be a latitude and a longitude. A 3D global position of the position sensor 220 is defined by a latitude, a longitude and a height from a sea level.

When the position relationship and the attitude relationship (that is, the alignment model) between the radar sensor 210 and the position sensor 220 are accurately measured, the global position of the object 230 (or a portion of the object 230) is accurately measured. For example, the position relationship and the attitude relationship between the radar sensor 210 and the position sensor 220 are measured using precise measurement tools. However, when the above precise measurement tools are absent, the position relationship and the attitude relationship between the radar sensor 210 and the position sensor 220 are inaccurately measured, the global position of the object 230 is inaccurately measured.

When a shape of an object is known in advance even though the precise measurement tools are absent, the alignment model is calibrated to correspond to the shape of the object based on data acquired by the radar sensor 210. An example of a method of calibrating the alignment model between the radar sensor 210 and the position sensor 220 based on a shape of an object will be further described below with reference to FIGS. 3 through 13.

Figure 3:
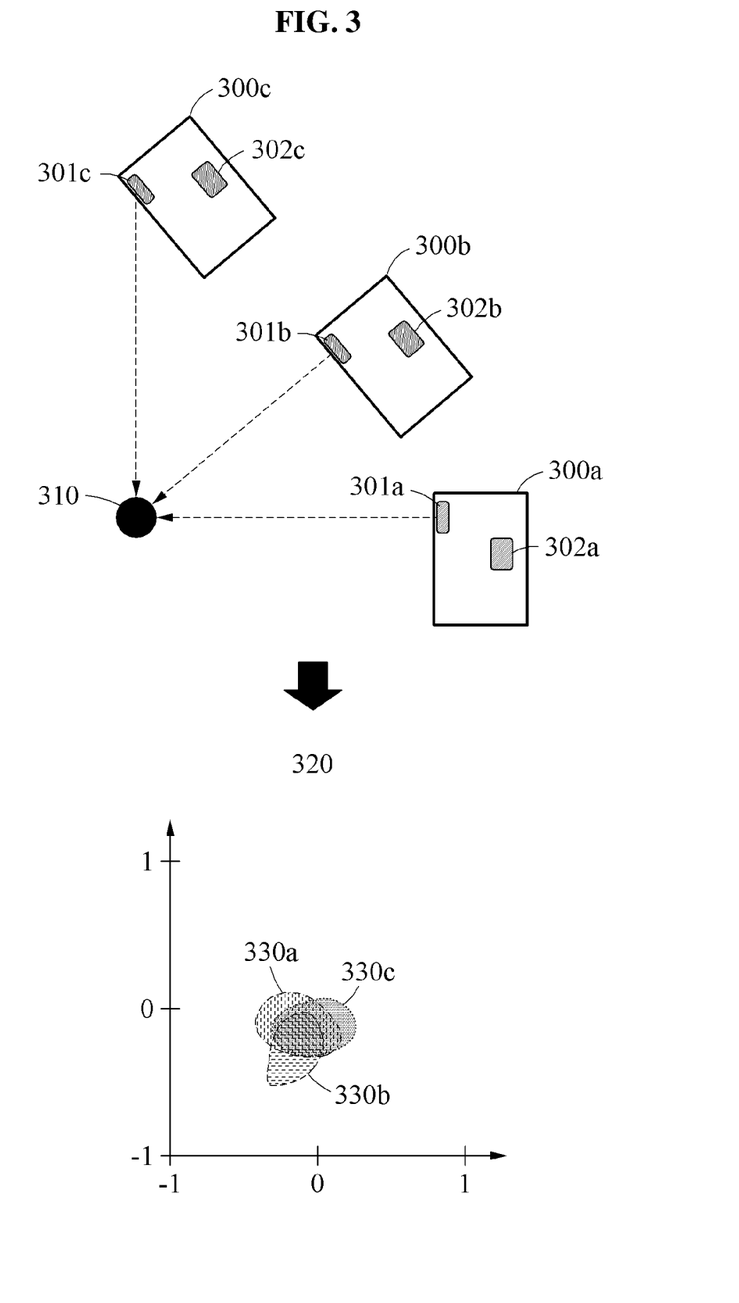
FIG. 3 illustrates an example of radar data for an object generated based on an alignment model that is properly calibrated.

FIG. 3 illustrates an example of radar data for an object generated based on an alignment model that is properly calibrated.

The radar sensor 210 and the position sensor 220 of FIG. 2 respectively correspond to a first sensor 301 and a second sensor 302. An electronic device 300 includes the first sensor 301 and the second sensor 302.

At a first point in time, an electronic device 300a generates radar data for an object 310 using a radar 301a. At a second point in time, an electronic device 300b generates radar data for the object 310 using a radar 301b. At a third point in time, an electronic device 300c generates radar data for the object 310 using a radar 301c. Radar data is represented by points. For example, the radar data for the object 310 is acquired during traveling of a vehicle including the electronic device 300.

The electronic device 300 generates a radar map 320 by processing the acquired radar data. Coordinates of the radar data acquired at different points in time are changed based on an alignment model, and radar data 330a, 330b and 330c with changed coordinates are accumulated in the radar map 320. Coordinate axes of the radar map 320 shown in FIG. 3 are used to indicate a calculated global position of the object 310.

When the alignment model is properly calibrated, the radar data 330a, 330b and 330c may be accumulated in similar positions.

Figure 4:
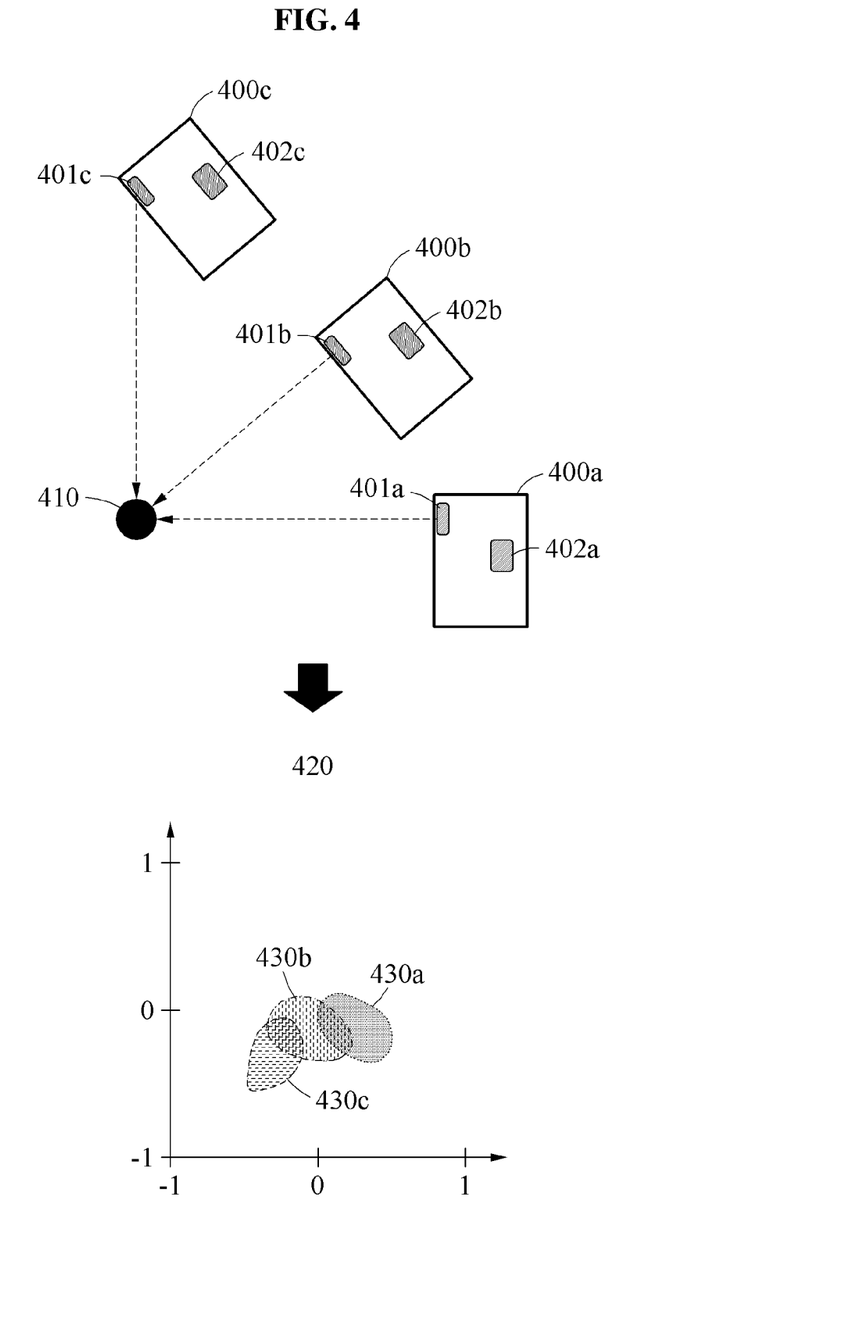
FIG. 4 illustrates an example of radar data for an object generated based on an alignment model reflecting a transition error between sensors.

FIG. 4 illustrates an example of radar data for an object generated based on an alignment model reflecting a transition error between sensors.

Similarly to FIG. 3, the radar sensor 210 and the position sensor 220 of FIG. 2 respectively correspond to a first sensor 401 and a second sensor 402. An electronic device 400 includes the first sensor 401 and the second sensor 402.

At a first point in time, an electronic device 400a generates radar data for an object 410 using a radar 401a. At a second point in time, an electronic device 400b generates radar data for the object 410 using a radar 401b. At a third point in time, an electronic device 400c generates radar data for the object 410 using a radar 401c. Radar data is represented by points. For example, the radar data for the object 410 is acquired during traveling of a vehicle including the electronic device 400.

When a position relationship between the first sensor 401 and the second sensor 402 has an error (for example, a transition error), that is, when an alignment model is not properly calibrated, positions of radar data 430a, 430b and 430c accumulated on a radar map 420 are not fixed.

When the electronic device 400 linearly moves towards the object 410 despite a presence of a transition error, positions of radar data accumulated on the radar map 420 are not fixed (however, an accumulation position differs from an actual position). When the electronic device 400 rotates about the object 410, the radar data 430a, 430b and 430c are accumulated on the radar map 420 while drawing trajectories (that is, inconsistently).

Figure 5:
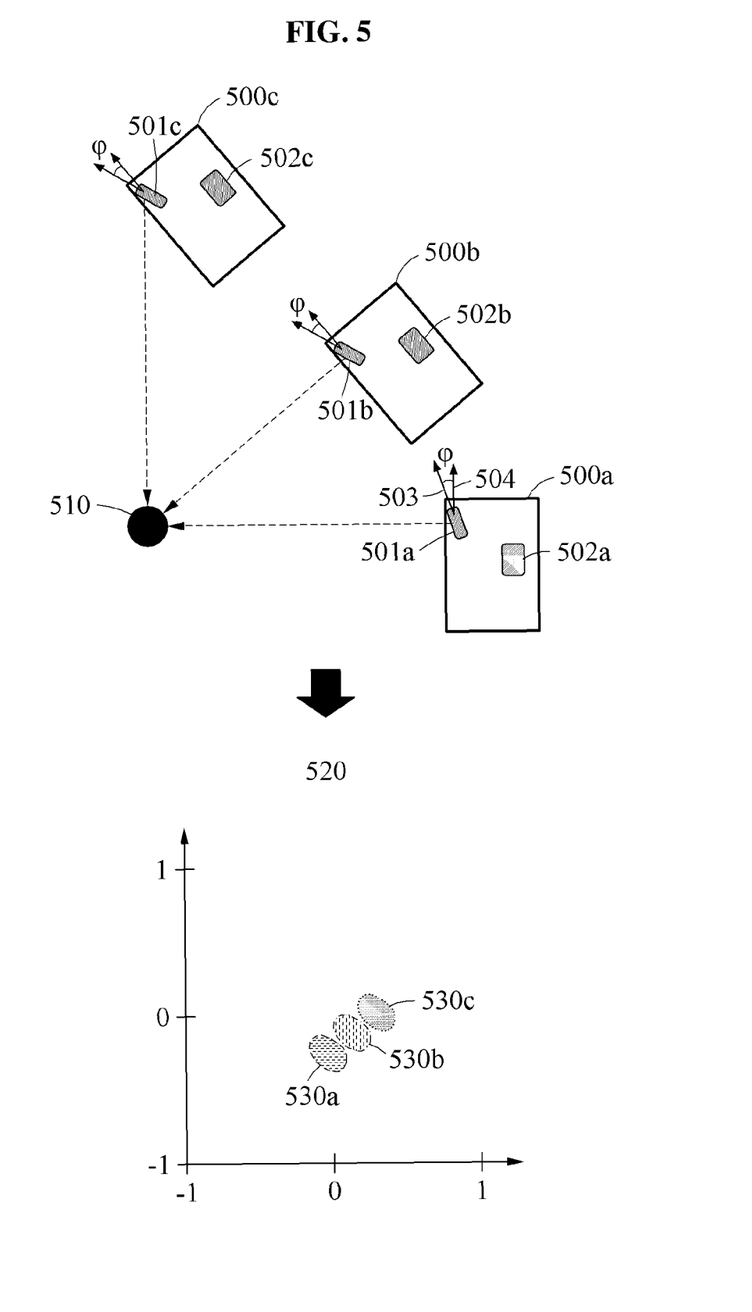
FIG. 5 illustrates an example of radar data for an object generated based on an alignment model reflecting an attitude error between sensors.

FIG. 5 illustrates an example of radar data for an object generated based on an alignment model reflecting an attitude error between sensors.

Similarly to FIGS. 3 and 4, the radar sensor 210 and the position sensor 220 of FIG. 2 respectively correspond to a first sensor 501 and a second sensor 502. An electronic device 500 includes the first sensor 501 and the second sensor 502.

At a first point in time, an electronic device 500a generates radar data for an object 510 using a radar 501a. At a second point in time, an electronic device 500b generates radar data for the object 510 using a radar 501b. At a third point in time, an electronic device 500c generates radar data for the object 510 using a radar 501c. Radar data is represented by points. For example, the radar data for the object 510 is acquired during traveling of a vehicle including the electronic device 500.

When an attitude relationship between the first sensor 501 and the second sensor 502 has an error (for example, an attitude error), that is, when an alignment model is not properly calibrated, positions of radar data 530a, 530b and 530c accumulated on a radar map 520 are not fixed. For example, despite an actual difference $\varphi$ between a heading angle of the first sensor 501 and a heading angle of the second sensor 502, when the difference $\varphi$ is not accurately reflected to the alignment model, the attitude error occurs.

The attitude error results in inconsistency of the positions of the radar data 530a, 530b and 530c accumulated on the radar map 520 in both an example in which the electronic device 500 rotates about the object 510 and an example in which the electronic device 500 linearly moves towards about the object 510.

In response to analyzing of the trajectories of the radar data 430a, 430b and 430c caused by the transition error or the trajectories of the radar data 530a, 530b and 530c caused by the attitude error as described above with reference to FIGS. 3 through 5, which element of a current alignment model needs to be calibrated may be determined.

Figure 6:
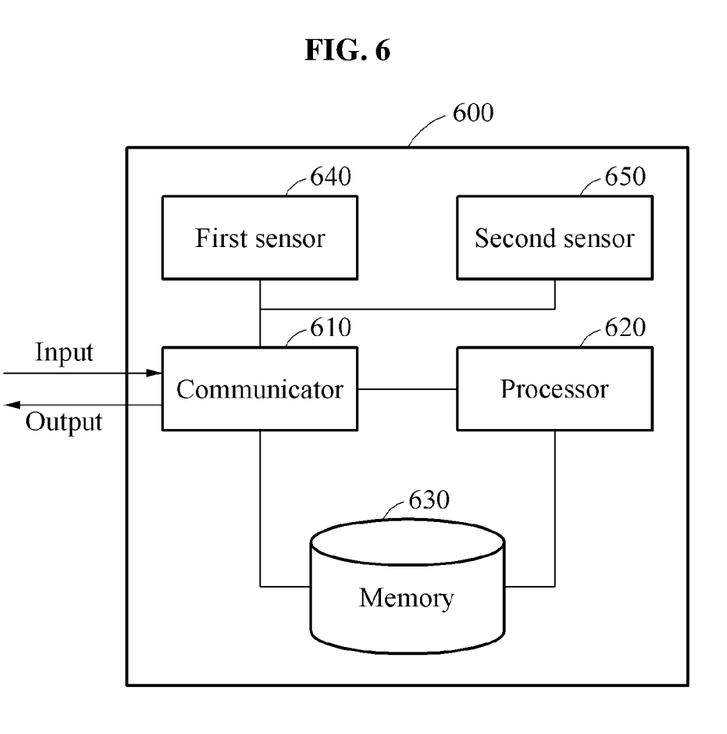
FIG. 6 illustrates an example of a configuration of an electronic device for calibrating an alignment model.

FIG. 6 illustrates an example of a configuration of an electronic device 600 for calibrating an alignment model.

Referring to FIG. 6, the electronic device 600 includes a communicator 610, a processor 620, and a memory 630. The electronic device 600 may be included in a vehicle. In an example, the electronic device 600 may be an electronic control unit (ECU) of the vehicle. In another example, the electronic device 600 may be connected to the ECU of the vehicle.

The electronic device 600 further includes a first sensor 640 and a second sensor 650. The first sensor 640 corresponds to the radar sensor 210 of FIG. 2. For example, the first sensor 640 may use an FMCW signal, or a PMCW signal. The second sensor 650 corresponds to the position sensor 220 of FIG. 2. The second sensor 650 includes, for example, any one or any combination of a global navigation satellite system (GNSS), a global positioning system (GPS) and an inertial measurement unit (IMU).

The communicator 610 is connected to the processor 620, the memory 630, the first sensor 640 and the second sensor 650 and configured to transmit and receive data. The communicator 610 may be connected to an external device and configured to transmit and receive data.

The communicator 610 is implemented, for example, as a circuitry in the electronic device 600. In an example, the communicator 610 may include an internal bus and an external bus. In another example, the communicator 610 may be a device configured to connect the electronic device 600 to an external device. The communicator 610 may be, for example, an interface. The communicator 610 may receive data from the external device, and may transmit data to the processor 620 and the memory 630.

When the electronic device 600 does not include the first sensor 640 and the second sensor 650, the communicator 610 may receive data acquired from the first sensor 640 and the second sensor 650.

The processor 620 is configured to process data received by the communicator 610 and data stored in the memory 630. The term "processor," as used herein, may be a hardware-implemented data processing device having a circuit that is physically structured to execute desired operations. For example, desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 620 may execute a computer-readable code (for example, software) stored in a memory (for example, the memory 630), and may execute instructions caused by the processor 620.

The memory 630 is configured to store data received by the communicator 610 and data processed by the processor 620. For example, the memory 630 may store a program. The stored program may be coded to calibrate an alignment model and may be a set of syntax executable by the processor 620.

The memory 630 may include, for example, any one or any combination of a volatile memory, a nonvolatile memory, a random access memory (RAM), a flash memory, a hard disk drive, and an optical disc drive.

The memory 630 stores an instruction set (for example, software) to operate the electronic device 600. The instruction set to operate the electronic device 600 is executed by the processor 620.

In an example, the first sensor 640 includes at least one antenna. In this example, the antenna performs a function of both receiving and transmitting a signal. In another example, the first sensor 640 includes an antenna to transmit a signal and an antenna to receive a signal.

The second sensor 650 is configured to measure a position of the second sensor 650. The measured position may be a global position. As described above, the second sensor 650 includes, for example, any one or any combination of a GNSS, a GPS and an IMU.

The communicator 610, the processor 620, the memory 630, the first sensor 640 and the second sensor 650 will be further described below with reference to FIGS. 7 through 13.

Figure 7:
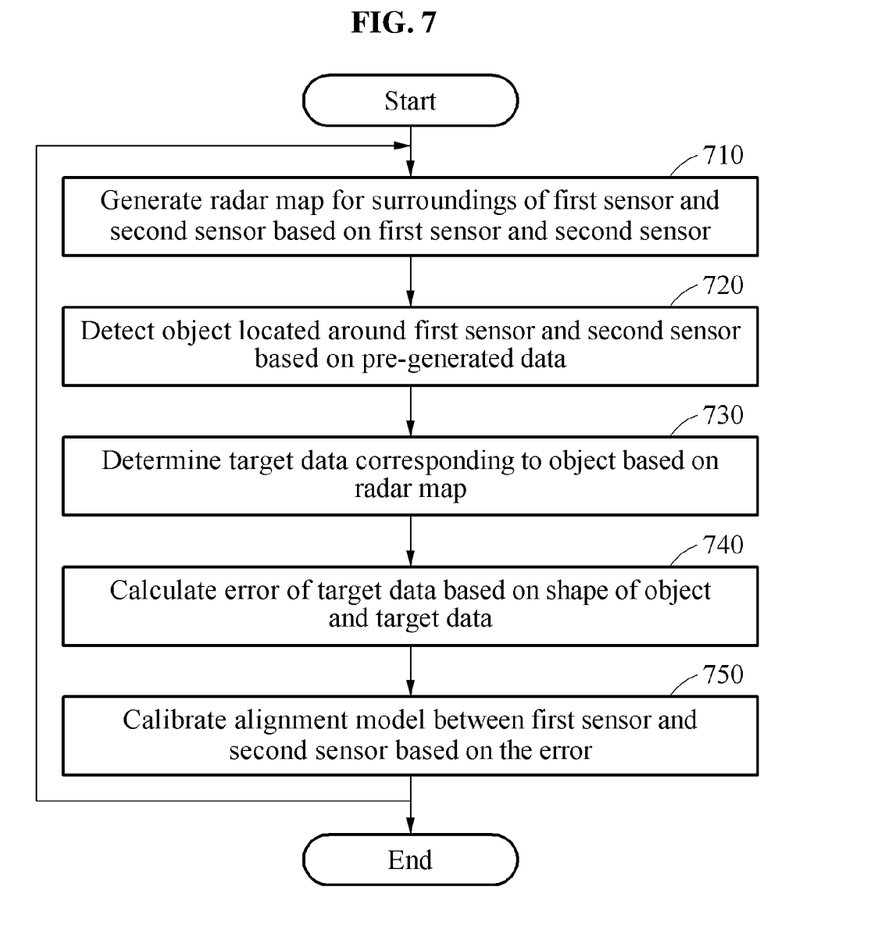
FIG. 7 is a flowchart illustrating an example of a method of calibrating an alignment model.

FIG. 7 is a flowchart illustrating an example of a method of calibrating an alignment model.

Operations 710 through 750 of FIG. 7 are performed by, for example, the electronic device 600 of FIG. 6.

In operation 710, the electronic device 600 generates a radar map for surroundings of the first sensor 640 and the second sensor 650 (that is, the electronic device 600) based on the first sensor 640 and the second sensor 650. For example, a position (for example, a position ($x_{radar}$, $y_{radar}$)) of an object based on the first sensor 640 is calculated using the first sensor 640, a global position of the object is calculated based on the calculated position and an alignment model between the first sensor 640 and the second sensor 650, and a radar map is generated by accumulating the calculated global position of the object. The alignment model is used to process data acquired by the first sensor 640 and the second sensor 650 based on a position relationship between the first sensor 640 and the second sensor 650 and a difference between an attitude of the first sensor 640 and an attitude of the second sensor 650. An example of generating a radar map will be further described below with reference to FIG. 8.

In operation 720, the electronic device 600 detects an object located around the first sensor 640 and the second sensor 650 based on pre-generated data. The pre-generated data is, but is not limited to, an image generated using a camera and map data. Examples of detecting an object will be further described below with reference to FIGS. 9 and 10. Although operations 710 and 720 are sequentially performed as shown in FIG. 7, operation 720 may be performed prior to operation 710, or operations 710 and 720 may be simultaneously performed.

In operation 730, the electronic device 600 determines target data corresponding to the detected object based on the radar map. The electronic device 600 determines target points corresponding to the object among a plurality of points accumulated on the radar map, and determines target data. The target data is, for example, a set of target points. For example, points accumulated at a position similar to an estimated position of the detected object on the radar map are determined to be target data.

In operation 740, the electronic device 600 calculates an error of the target data based on the target data and a shape of the detected object. In an example, the error of the target data is a sum of distances between the shape of the object and points that do not correspond to the shape of the object. In another example, the error of the target data is a number of points that do not correspond to the shape of the object. An example of calculating an error of target data will be further described below with reference to FIGS. 11 and 12.

In operation 750, the electronic device 600 calibrates the alignment model between the first sensor 640 and the second sensor 650 based on the calculated error. For example, the alignment model is calibrated to minimize the calculated error. The alignment model is calibrated by calibrating at least one of an attitude relationship and the position relationship between the first sensor 640 and the second sensor 650. An example of calibrating an alignment model will be further described below with reference to FIG. 13.

When operation 750 is performed, operations 710 through 750 are repeated using the calibrated alignment model. The alignment model is calibrated until a desired result is acquired.

Figure 8:
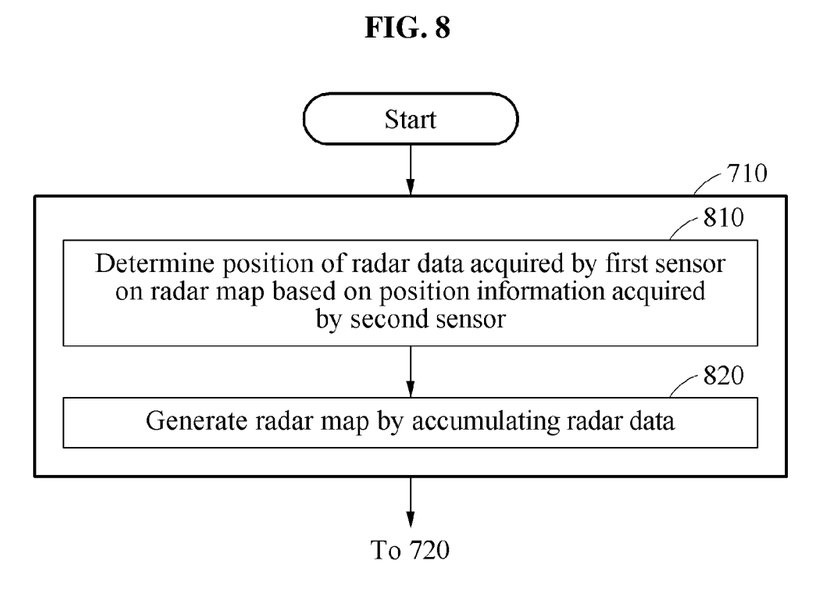
FIG. 8 is a flowchart illustrating an example of generating a radar map for surroundings of sensors.

FIG. 8 is a flowchart illustrating an example of generating a radar map for surroundings of sensors.

Referring to FIG. 8, operation 710 of FIG. 7 includes operations 810 and 820.

In operation 810, the electronic device 600 determines a position of radar data acquired by the first sensor 640 on a radar map based on position information acquired by the second sensor 650. For example, position information (for example, an absolute position) of an object is calculated based on a distance between the object and the first sensor 640, position information (for example, an absolute position) of the second sensor 650, and the alignment model between the first sensor 640 and the second sensor 650. A position on a radar map corresponding to the calculated position information of the object is determined.

In operation 820, the electronic device 600 generates the radar map by accumulating radar data. For example, when a relative position between an object and the electronic device 600 and an attitude of the electronic device 600 are changing, radar data may be acquired at different points in time, and the acquired radar data may be accumulated on the radar data.

Figure 9:
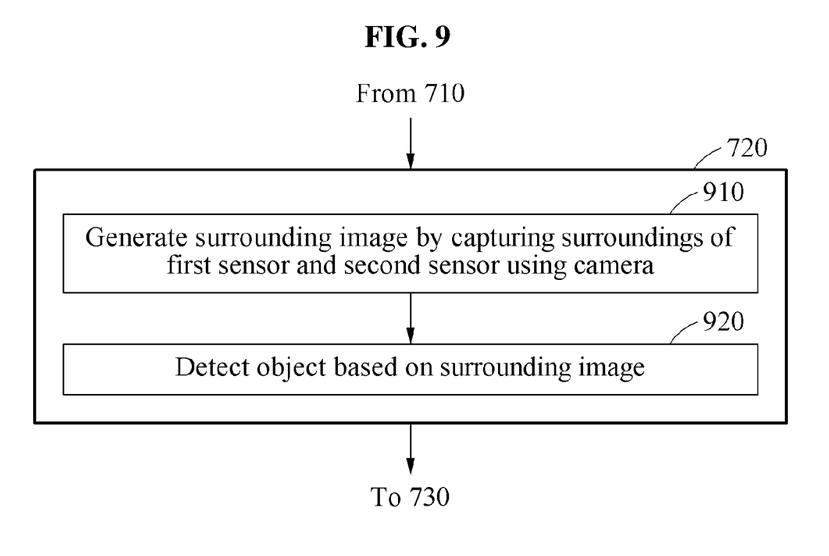
FIG. 9 is a flowchart illustrating an example of detecting an object located around sensors.

FIG. 9 is a flowchart illustrating an example of detecting an object located around sensors.

Referring to FIG. 9, operation 720 of FIG. 7 includes operations 910 and 920.

In operation 910, the electronic device 600 generates a surrounding image by capturing surroundings of the first sensor 640 and the second sensor 650 using a camera (not shown). Depending on examples, the electronic device 600 may further include a camera.

In operation 920, the electronic device 600 detects at least one object based on the surrounding image. For example, an image processing algorithm is used to detect an object in an image.

Figure 10:
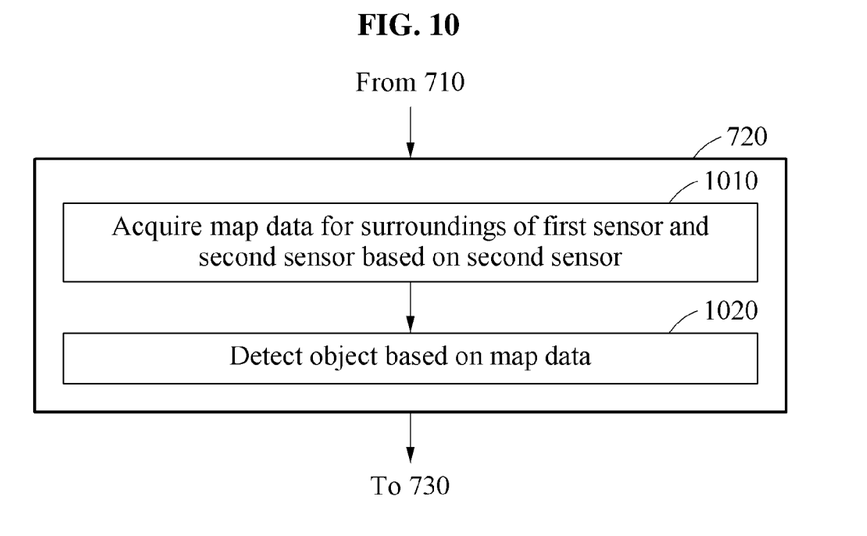
FIG. 10 is a flowchart illustrating another example of detecting an object located around sensors.

FIG. 10 is a flowchart illustrating another example of detecting an object located around sensors.

Referring to FIG. 10, operation 720 of FIG. 7 includes operations 1010 and 1020.

In operation 1010, the electronic device 600 acquires map data for surroundings of the first sensor 640 and the second sensor 650 based on the second sensor 650. For example, the second sensor 650 acquires an absolute position of the second sensor 650, and the electronic device 600 acquires a portion of pre-stored map data corresponding to the absolute position. Map data stored in the electronic device 600 is associated with a preset area. The map data includes information about at least one object located within the area.

In operation 1020, the electronic device 600 detects an object based on the map data.

Figure 11:
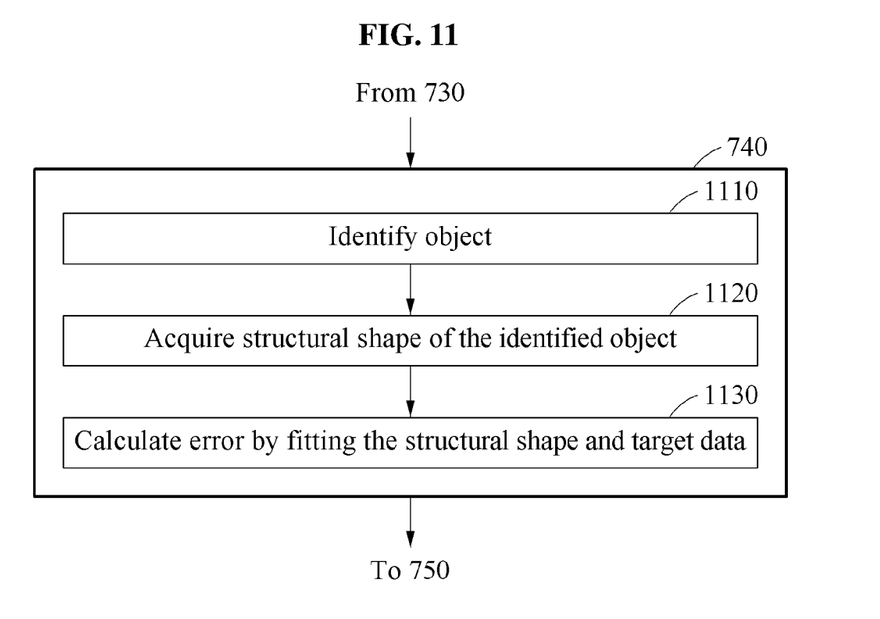
FIG. 11 is a flowchart illustrating an example of calculating an error of target data based on a shape of an object.

FIG. 11 is a flowchart illustrating an example of calculating an error of target data based on a shape of an object.

Referring to FIG. 11, operation 740 of FIG. 7 includes operations 1110, 1120 and 1130.

In operation 1110, the electronic device 600 identifies the object detected based on the pre-generated data. For example, a type of the detected object is identified.

In operation 1120, the electronic device 600 acquires a structural shape of the identified object. The structural shape of the object is, for example, a shape of a cross section of the object. The structural shape of the object is stored in advance.

In operation 1130, the electronic device 600 calculates an error by fitting the target data and the structural shape of the object.

Hereinafter, examples of operations 1110 through 1130 are described with reference to FIG. 12.

Figure 12:
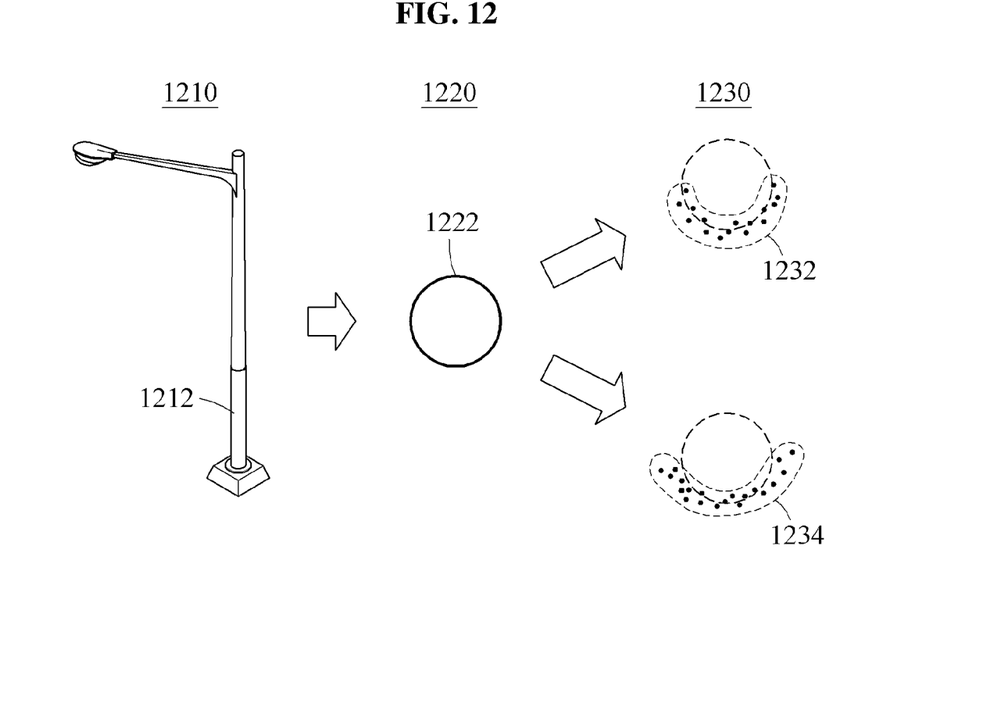
FIG. 12 illustrates an example of a shape of an object, target data and an error of the target data.

FIG. 12 illustrates an example of a shape of an object, target data and an error of the target data.

Referring to FIG. 12, in operation 1210, the electronic device 600 identifies an object 1212. For example, the object 1212 is identified as a street light. Also, a manufacture brand or a model name of the object 1212 is identified.

In operation 1220, the electronic device 600 acquires a structural shape 1222 of the object 1212. The structural shape 1222 is, for example, a shape of a cross section of the object 1212.

In operation 1230, the electronic device 600 fits the structural shape 1222 and target data 1232 and 1234. The target data 1232 is properly fitted to the structural shape 1222 since the target data 1232 is similar to the structural shape 1222. However, the target data 1234 is not properly fitted to the structural shape 1222.

Because the target data 1232 is acquired based on an alignment model that is properly calibrated, a calculated error is less than a threshold. Because the target data 1234 is acquired based on an alignment model that is not properly calibrated, a calculated error exceeds the threshold.

Figure 13:
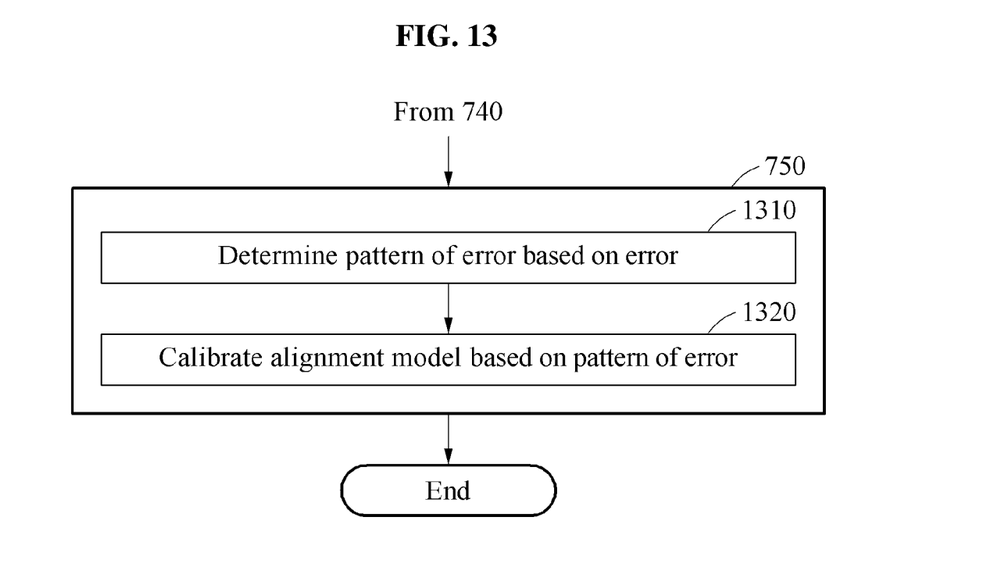
FIG. 13 is a flowchart illustrating an example of calibrating an alignment model based on an error of target data.

FIG. 13 is a flowchart illustrating an example of calibrating an alignment model based on an error of target data.

Referring to FIG. 13, operation 750 of FIG. 7 includes operations 1310 and 1320.

In operation 1310, the electronic device 600 determines a pattern of an error based on the error of target data.

The pattern of the error includes a transition error pattern indicating an error in the position relationship between the first sensor 640 and the second sensor 650, and an attitude error pattern indicating an attitude error between the attitude of the first sensor 640 and the attitude of the second sensor 650.

For example, the pattern of the error is determined based on trajectories of radar data described above with reference to FIGS. 4 and 5. When a trajectory is formed due to a rotation movement of the electronic device 600, instead of a linear movement of the electronic device 600, a transition error pattern is determined. An attitude error pattern is not limited to any one of the linear movement and the rotation movement of the electronic device 600, but may result in trajectories of radar data.

In operation 1320, the electronic device 600 calibrates the alignment model based on the pattern of the error. For the transition error pattern, the position relationship between the first sensor 640 and the second sensor 650 is calibrated. For the attitude error pattern, an attitude relationship between the first sensor 640 and the second sensor 650 is calibrated. The alignment model is calibrated to minimize the error of the target data.

The radar 100, the electronic device 600, other apparatuses, devices, and other components described herein with respect to FIGS. 1 and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, an FPGA, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7 through 11 and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An alignment model calibration method comprising:
    generating a radar map for surroundings of a first sensor and a second sensor based on an alignment model between the first sensor and the second sensor, the first sensor being configured to use a radar and the second sensor being configured to determine a position of the second sensor;
    detecting at least one object located around the first sensor and the second sensor based on pre-generated data;
    determining target data corresponding to the at least one object based on the radar map;
    calculating an error of the target data based on a shape of the at least one object and the target data; and
    calibrating the alignment model between the first sensor and the second sensor based on the error,
    wherein the alignment model is used to process data acquired by the first sensor and the second sensor based on a position relationship between the first sensor and the second sensor, and a difference between an attitude of the first sensor and an attitude of the second sensor.

2. The alignment model calibration method of claim 1, wherein generating the radar map comprises:
    determining a position of radar data acquired by the first sensor on the radar map based on position information acquired by the second sensor; and
    generating the radar map by accumulating the radar data.

3. The alignment model calibration method of claim 1, wherein detecting the at least one object comprises:
    generating a surrounding image by capturing the surroundings of the first sensor and the second sensor using a camera; and
    detecting the at least one object based on the surrounding image.

4. The alignment model calibration method of claim 1, wherein detecting the at least one object comprises:
    acquiring map data for the surroundings of the first sensor and the second sensor based on the second sensor; and
    detecting the at least one object based on the map data.

5. The alignment model calibration method of claim 1, wherein calculating the error of the target data comprises:
    identifying the at least one object;
    acquiring a structural shape of the identified at least one object; and
    calculating the error by fitting the structural shape and the target data.

6. The alignment model calibration method of claim 1, wherein calibrating the alignment model comprises calibrating the alignment model to minimize the error.

7. The alignment model calibration method of claim 1, wherein the first sensor is configured to use a frequency-modulated continuous-wave (FMCW) signal or a phase-modulated continuous-wave (PMCW) signal.

8. The alignment model calibration method of claim 1, wherein the second sensor comprises any one or any combination of a global navigation satellite system (GNSS), a global positioning system (GPS) and an inertial measurement unit (IMU).

9. The alignment model calibration method of claim 1, wherein the first sensor and the second sensor are included in a vehicle.

10. The alignment model calibration method of claim 9, wherein the vehicle is an autonomous vehicle, or has a function of an advanced driver assistance system (ADAS).

11. A non-transitory computer-readable storage medium storing instructions that, when executed by a processor, cause the processor to perform the alignment model calibration method of claim 1.

12. An electronic device comprising:
a memory configured to store a program; and
a processor configured to execute the program,
wherein the program is executed to perform:
generating a radar map for surroundings of a first sensor and a second sensor, the first sensor being configured to use a radar and the second sensor being configured to determine a position of the second sensor;
detecting at least one object located around the first sensor and the second sensor based on pre-generated data;
determining target data corresponding to the at least one object based on the radar map;
calculating an error of the target data based on a shape of the at least one object and the target data;
determining a pattern of the error based on the error;
calibrating an alignment model between the first sensor and the second sensor based on the pattern of the error,
wherein the pattern of the error comprises at least one of a transition error pattern indicting an error in a position relationship between the first sensor and the second sensor, and an attitude error pattern indicating an attitude error between an attitude of the first sensor and an attitude of the second sensor.

13. The electronic device of claim 12, further comprising:
the first sensor; and
the second sensor.

14. The electronic device of claim 12, wherein the electronic device is included in an autonomous vehicle, or a vehicle having a function of an advanced driver assistance system (ADAS).

15. An alignment model calibration method comprising:
generating a radar map for surroundings of a first sensor and a second sensor, the first sensor being configured to use a radar and the second sensor being configured to determine a position of the second sensor;
detecting at least one object located around the first sensor and the second sensor based on pre-generated data;
determining target data corresponding to the at least one object based on the radar map;
calculating an error of the target data based on a shape of the at least one object and the target data;
determining a pattern of the error based on the error; and
calibrating an alignment model between the first sensor and the second sensor based on the pattern of the error,
wherein the pattern of the error comprises at least one of a transition error pattern indicting an error in a position relationship between the first sensor and the second sensor, and an attitude error pattern indicating an attitude error between an attitude of the first sensor and an attitude of the second sensor.

16. A non-transitory computer-readable storage medium storing instructions that, when executed by a processor, cause the processor to perform the method of claim 15.

* * * * *